United States Patent [19]

Devillers

[11] 3,991,636

[45] Nov. 16, 1976

[54] CONTROL APPARATUS FOR A MACHINE FOR CUTTING A WORKPIECE

[75] Inventor: Julien Devillers, Livry Gargan, France

[73] Assignee: Intercontinental Trading Company, Puteaux, France

[22] Filed: July 1, 1974

[21] Appl. No.: 484,573

[30] Foreign Application Priority Data

July 12, 1973 France .............................. 73.25551

[52] U.S. Cl. ............................... 83/12; 51/165.72; 33/23 H; 83/71
[51] Int. Cl.² ........................................... B26D 3/08
[58] Field of Search ............................ 83/12, 6–11, 83/71, 925 CC; 51/34 FL, 165.72; 33/23 H, 27 K

[56] References Cited

UNITED STATES PATENTS

| | | | |
|---|---|---|---|
| 3,673,900 | 7/1972 | Jendrisak et al. | 83/12 |
| 3,735,534 | 5/1973 | Mayo | 51/165.72 |
| 3,756,104 | 9/1973 | Bier et al. | 83/12 |

*Primary Examiner*—Donald R. Schran
*Attorney, Agent, or Firm*—Norman Lettvin; Gerald S. Geren

[57] ABSTRACT

The invention concerns a control apparatus for machines designed to operate on a workpiece. The apparatus comprises a programming element consisting of a disc which has concentric tracks of varying transparency or reflectance; an optical scanner comprising an emitter unit emitting light beams to the programming element and a receptor unit for the light beams which have been transmitted or reflected; drive means for rotating the disc by the relative displacement of a tool and the workpiece; and an electric circuit connected to the receptor unit and to a motor for controlling the speed of rotation of the motor as a function of the intensity of the signal given by the receptor unit. The apparatus is applicable in particular to machines for working on plates, pieces of glass or plastics material, for example window panes, plate glass or lenses.

10 Claims, 4 Drawing Figures

CONTROL APPARATUS FOR A MACHINE FOR CUTTING A WORKPIECE

BACKGROUND OF THE INVENTION

The invention relates to a control device for imposing a programme of speeds of relative displacement between a workpiece and a tool. Although the invention is applicable to workpieces of any form it is particularly applicable to workpieces in the form of plates. The invention is designed particularly to apply to workpieces made of glass or plastics material, for example lenses or glass panes or plate glass and in particular to the window panes of car windows.

The increase in production rates which are desired makes it necessary to reduce the time of work on each piece and consequently to increase the speed of relative displacement between the tool and the workpiece. Under these conditions it is obviously not possible to use a speed of displacement which is both rapid and uniform since for example the cutting of a very round piece of glass plate can only be carried out slowly while the cutting of a straight or only slightly curved piece can be carried out at a high speed. It is therefore necessary to provide devices by means of which the instantaneous speed of relative displacement between the tool and the workpiece can be varied according to the contour along which the tool is required to work on the workpiece.

The apparatus according to the invention precisely enables the instantaneous speed of relative displacement between a workpiece and its tool to be varied according to a predetermined program which can be suitably adapted to each type of work to be carried out.

The apparatus according to the invention is designed to be used in association with a machine which comprises a tool in relative displacement against the workpiece on which it is required to operate, the function of the apparatus being to impose a program of speeds on this displacement.

SUMMARY OF THE INVENTION

The invention provides a control apparatus for a machine operable on a workpiece by means of a tool in relative displacement against the workpiece, which control apparatus is operable to impose a program of speeds on this displacement, the said machine comprising: a tool for operating on the workpiece; means for displacing the workpiece or the tool along a predetermined path; means for keeping the tool and the workpiece in operating contact during the movement along this path; and a motor for producing this displacement; the said apparatus being characterised in that it comprises: a programming element having zones of varying transparency or reflectance; an emitter unit for emitting light beams to the programming element and an associated receptor unit for receiving the light beams which have been transmitted or reflected; means for turning the programming element so that one complete rotation corresponds to one complete movement along the path; an electric circuit connected to the receptor unit and to the motor for controlling the speed of rotation of the motor as a function of the intensity of the signal provided by the receptor unit so that the speed of displacement of the workpiece or of the tool varies during the movement along the path according to the programme defined by the zones of the programming element.

The apparatus according to the invention may be associated with a machine for cutting a workpiece, this machine comprising a horizontal table for supporting the workpiece, a horizontal jig defining a cutting path, a freely displaceable carriage equipped with a cutting tool and a motor adapted to produce the displacement of the carriage along the jig.

It may also be associated with a machine for grinding the edges of the workpiece, this machine comprising the following parts: an endless conveyor defining a path of displacement for the workpiece; a motor for driving the conveyor and at least one rotary grinding tool placed on one of the sides of the conveyor so as to come into contact with one of the sides of the workpiece during its displacement.

BRIEF DESCRIPTION OF THE DRAWINGS

Two applications of the apparatus according to the invention to a machine for cutting plates and to a machine for grinding the edges of a plate of glass as represented above are described hereinafter by way of example, with reference to the accompanying drawings. The drawings are given purely for illustration and do not in any way limit the embodiments of the invention. In these drawings.

DETAILED DESCRIPTION OF PREFERRED EMBODIMENTS

Figure 1:
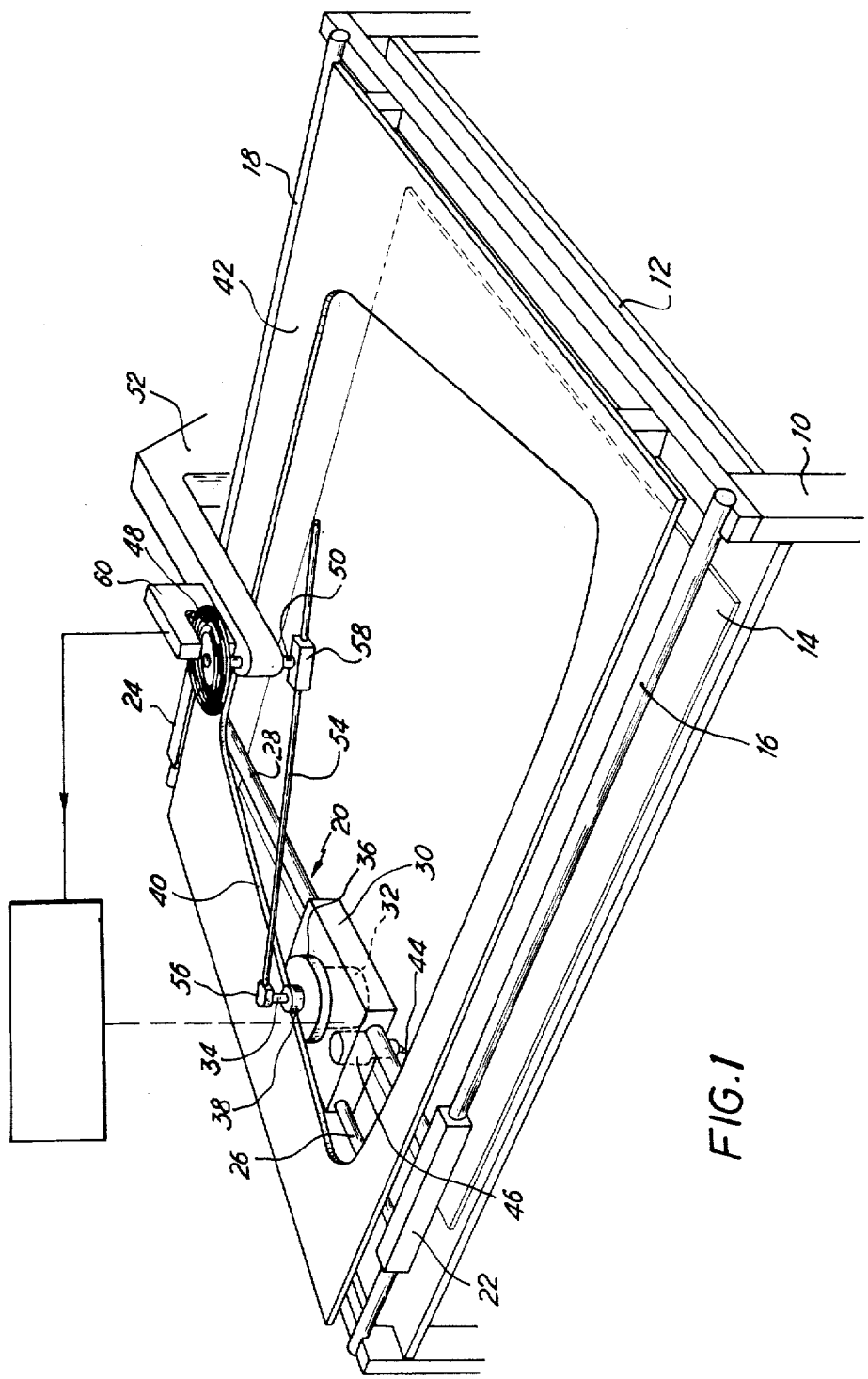
FIG. 1 is a view in perspective of a machine for cutting plates of glass, equipped with a control apparatus according to the invention.

The machine for cutting plates of glass shown in FIG. 1 comprises a stand 10 and a horizontal table 12 covered with felt on which a plate of glass 14 rests. This plate is placed on the table and removed from it by known means which will not be described here.

The stand 10 also supports two horizontal parallel rods 16 and 18 which define the rolling path of a bridge 20. The bridge 20 consists of two sleeves 22 and 24 free to slide on their respective rods 16 and 18 and rigidly connected to each other by two other rods 26 and 28 which are parallel to each other and perpendicular to the rods 16 and 18 and define a second rolling path on which the carriage 30 is slidable. The carriage 30 is equipped with a motor 32 (shown in broken lines) which rotates a vertical shaft 34 on which an electromagnet 36 and roller 38 are mounted, the said roller 38 rolling against the internal edge 40 of a horizontal metal jig 42. The roller 38 is applied against the internal edge of the electromagnet and its rotation causes the carriage to move in a horizontal plane along the contour defined by the jig.

The carriage 30 is also equipped with a cutting wheel 44 made of steel or tungsten which is applied against the upper surface of the plate 14 by means of a jack 46 so that it cuts the plate of glass according to the contour defined by the jig.

The control apparatus associated with this machine provides the means for varying the speed of rotation of the motor 32 of the carriage and hence also the speed of displacement of the carriage along the contour of the jig.

This control apparatus comprises a disc 48 which has zones of varying transparency or reflection and which is connected to a vertical shaft 50 rotatable in a bracket 52 fixed to the stand. The disc 48 is rotated by means of a horizontal rod 54 one end of which is linked to the carriage 30 by means of a collar 56 loosely mounted on the shaft 34 of the motor of the carriage while the other end slides in a sleeve 58 which is integrally connected to the shaft 50 which drives the disc. The disc is therefore situated above the glass plate and in the central region of the jig.

The bracket 52 also supports an optical scanner 60 which will be described in detail in the course of the description. This scanner is designed to collect the information on the disc and transmit it to the motor 32 so that for each position of the disc, which corresponds to a single position of the carriage, the information scanned will be converted into a signal to control the instantaneous speed of rotation of the motor.

The disc may also carry other information which may be used, for example, for controlling the jack 46. The descent of the cutting wheel before cutting the plate and its return after cutting the plate may thus be controlled automatically.

FIG. 1 shows schematically the functional connection between the scanner 60 and motor 32.

Figure 2:
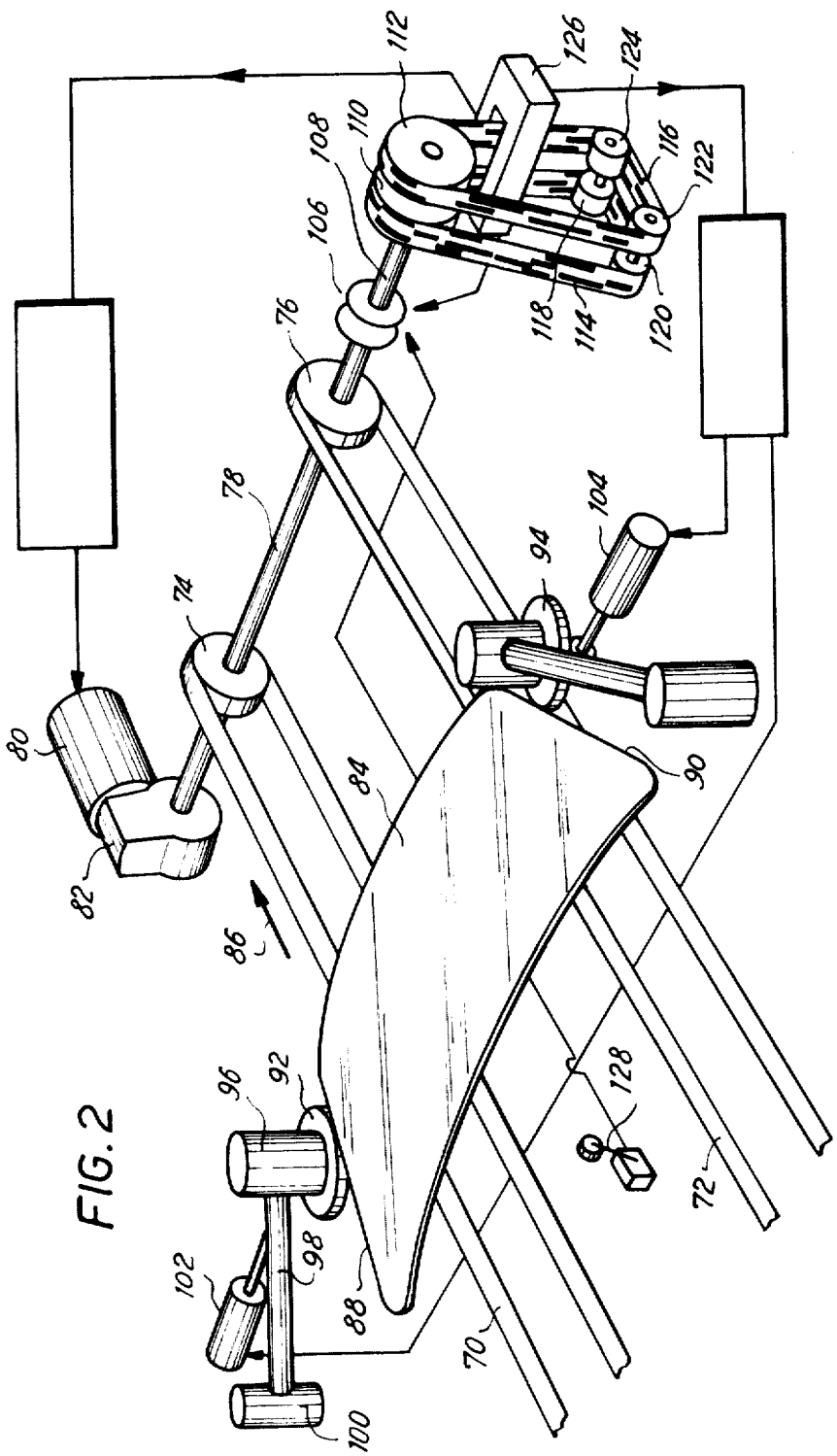
FIG. 2 is a view in perspective of a machine for grinding the edges of plates of glass, equipped with a control apparatus according to the invention.

The machine for grinding the edges of the glass plate represented in FIG. 2 comprises two conveyor belts 70 and 72 (shown only partially) driven respectively by two pulleys 74 and 76 mounted on a shaft 78 which is driven by a motor 80 by way of a reduction gearing 82.

The belts 70 and 72 serve to displace a glass plate 84 in the direction indicated by the arrow 86. The means used for placing the glass plate on the belts and the means for removing them after grinding have not been described since they are known per se and therefore do not form part of this invention.

In the course of the displacement of the plate 84, its edges 88 and 90 are ground by two grinding wheels 92 and 94 respectively. The grinding wheel 92 is rotated in the horizontal plane by a motor 96 mounted on the end of an arm 98 the other end of which pivots about a fixed vertical shaft 100. The arm 98 is subjected to the action of a jack 102 which tends to apply the grinding wheel 92 against the edge 88 of the glass plate during the displacement of the latter.

The grinding wheel 94 is applied against the edge 90 of the glass plate by a similar device by way of a jack 104.

The shaft 78 is provided with a clutch mechanism 106 by means of which it can drive a shaft 108 which carries two pulleys 110 and 112 each of which drives one of two loops of band 114 and 116 which carry the zones of varied transparency or reflection. The band 114 is also passed round two other pulleys 118 and 120 and similarly the band 116 around the two pulleys 122 and 124.

The band 114 carries information for controlling the speed of the motor 80 while the band 116 carried information for controlling the jacks 102 and 104.

The apparatus also comprises an optical scanner 126 the operation of which will be described later and an electric switch 128 which is actuated by the passage of a glass plate over it and serves to control the clutch mechanism 106 by means known in the art.

The machine equipped with a control apparatus as described above operates as follows:

In the absence of a plate of glass, the clutch mechanism 106 is disconnected so that the bands 114 and 116 are immobilized in a position such that the information which is contained on the band 114 and read by the scanner 126 corresponds to the maximum speed of the conveyor belts. When a plate of glass arrives on the conveyor belts, it is carried in the direction indicated by the arrow 86 and actuates the switch 128, thereby causing the clutch mechanism 106 to engage. The bands 114 and 116 are then driven and the information contained on them is translated into control of the motor speed on the one hand and control of the jacks on the other. The length of the bands 114 and 116 is preferably equal to that of the path of the glass plate on the belts from the position where the plate actuates the switch 128 to the position where the same plate leaves the grinding zone. When the bands have moved through their whole course, the glass plate has left the grinding zone and the belts have resumed their maximum speed so that they can rapidly remove the plate which has just been operated on and rapidly bring the next plate to the grinding zone. A particular signal which may be carried by one or other of the bands 114 and 116 then causes disconnection of the clutch mechanism 106 until the next action on the switch 128 which again causes engagement of the clutch mechanism 106. The apparatus according to the invention therefore enables the speed of displacement of the plate to be varied but also the force of application of the grinding wheels against the edges of the plate as a function of the particular form of its edges.

Instead of using two separate bands, all the information may be grouped on one band.

In one variation of the apparatus associated with the machine of FIG. 2, a disc comprising zones of varying transparency or reflection similar to that used with the machine of FIG. 1 may be used instead of the two bands 114 and 116. In that case, it is necessary to arrange that the disc, which is then driven by the shaft 108, performs one complete revolution for the corresponding movement of the glass plate in the grinding zone. This can be achieved simply by providing a suitable reduction gear so that one complete rotation of the disc corresponds to the displacement of the glass plate from the position where it actuates the contact 128 to the position where it leaves the grinding zone.

When the edges 88 and 90 of the glass plate 84 have been ground, the plate is carried to another similar machine after a quarter turn so that the two remaining edges are ground.

FIG. 2 shows schematically the functional connections between the optical scanner and the various elements which it controls as well as the connection between the switch 128 and the clutch mechanism 106 and the connection between the optical scanner and the clutch mechanism.

The particular function of the optical scanner will be explained in more detail in the course of the description.

Figure 3:
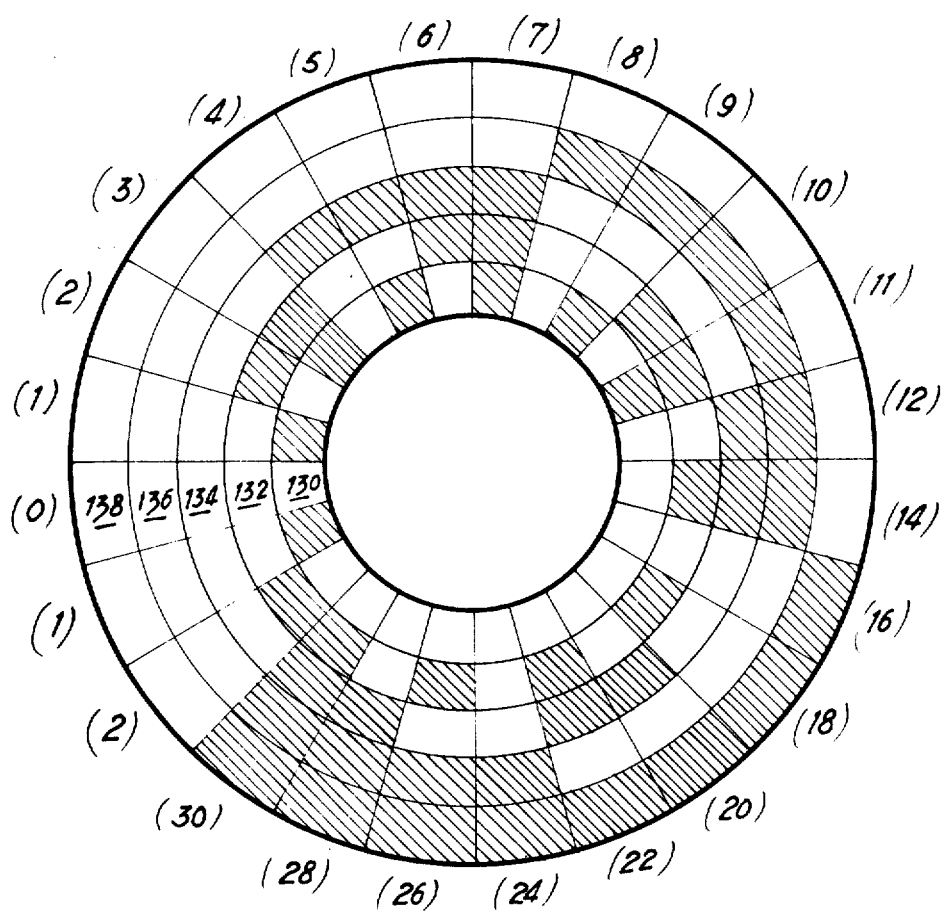
FIG. 3 represents a disc used as programming element in the apparatus according to the invention.

FIG. 3 shows a programming disc of the type used with the machine for cutting the edges of glass shown in FIG. 1. This disc has zones of varying transparency or reflectance formed by sectors of concentric tracks. In the case of FIG. 3, the disc has five concentric tracks 130, 132, 134, 136 and 138. Each track has zones of low transparency or low reflectance (in white on the Figure) and zones of high transparency or high reflectance (in black on the Figure). The information on these zones is designed to be read by a unit of emitters and associated receptors. One emitter of light beams and one photoelectric cell associated with it is provided for each track. In cases where the zones have varied transparency, the emitter and photoelectric cell for each track are arranged one on each side of the track so that if the light beams from the emitter encouter a non-transparent zone the photoelectric cell will not be lit up. If on the other hand the light beams encouter a transparent zone, the photoelectric cell is lit up. In the case of zones of varying reflectance, the light beam emitter and photoelectric cell associated with it are situated both on the same side of the disc so that the light beams from the emitter will be reflected in the direction of the photoelectric cell. Each photoelectric cell therefore responds to zones of varying transparency or reflectance by two different levels of electric output voltage. When the disc rotates, information on each track is detected independently sector for sector. Each cell when it is lit up switches a resistance by means of a relay. In the case of FIG. 3, each of the five cells may therefore independently switch one of the five resistances associated with them.

The photoelectric cells associated with the tracks 130, 132, 134, 136 and 138 switch respectively the resistances which have the values $R_0$, $2R_0$, $4R_0$, $8R_0$ and $16R_0$. If these five resistances are connected in series, all the multiples of $R_o$ between O and 31 $R_o$ can be obtained. Thirty-two multiple values of $R_o$ are therefore available. Some of these values are indicated in bracket opposite each corresponding sector on FIG. 3.

In the case where a disc with zones of varying transparency are used, that is to say a disc carrying either transparent zones or opaque zones, this can conveniently be obtained in the form of a photographic negative which can easily be reproduced with a simple photographic laboratory material.

If bands of varying transparency are used, these can very conveniently be obtained from photographic films used for black and white photography. The tracks obtained are then parallel.

The bands have the advantage that they can be reproduced with a simple photographic material and moreover they can easily be driven due to the presence of perforations along the lateral edges of the film. In the case of a film, the information is read in portions of parallel tracks.

Figure 4:
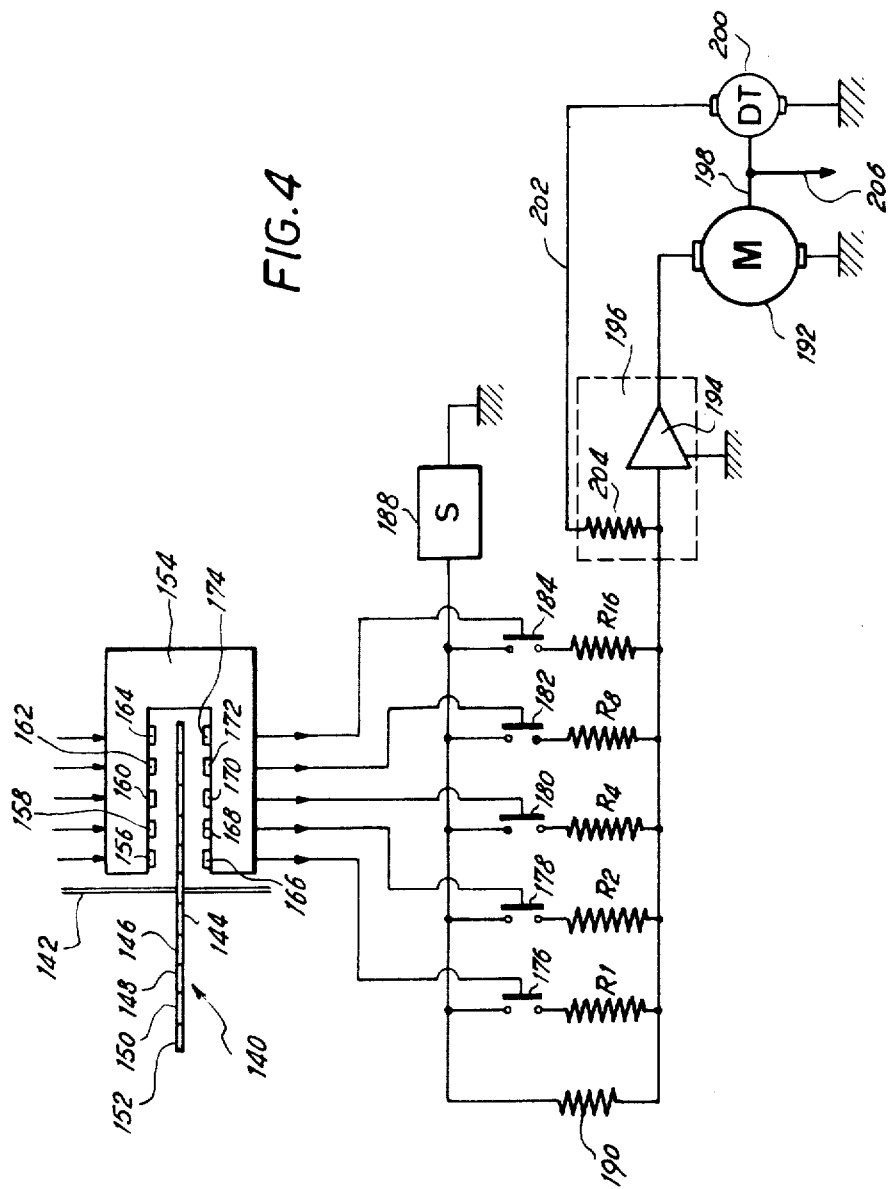
FIG. 4 is an electric circuit diagram of the apparatus according to the invention.

FIG. 4 shows a disc 140 similar to that shown in FIG. 3 which rotates about a shaft 142 and has five concentric tracks 144, 146, 148, 150 and 152. The information on these five tracks is to be detected by an optical scanner 154 which comprises five light beam emitters 156, 158, 160, 162 and 164 and five photoelectric cells 166, 168, 170, 172 and 174 associated, respectively, with the tracks 144, 146, 148, 150 and 152.

When the photoelectric cells are lit up, they switch the resistance $R_1$, $R_2$, $R_4$, $R_8$ and $R_{16}$ which have the values $R_0$, $2R_0$, $4R_0$, $8R_0$ and $16R_0$, respectively, by means of the contacts 176, 178, 180, 182 and 184. These five resistances are connected in parallel along a conductor 186 which is supplied from a source of direct current 188.* The conductor 186 is connected to a continuous current motor 190 by way of the amplifier 194 of a variable speed regulator 196. The motor 192 is in fact the motor for the glass cutting or grinding machine (motor 32 of FIG. 1 or motor 80 of FIG. 2).

*The conductor 186 also carries a resistance 190 which offers a resistance to the current in conductor 186 when none of the resistances $R_1$, $R_2$, $R_4$, $R_8$ and $R_{16}$ has been switched.

The shaft 198 of the motor drives a tachymetric dynamo 200 which is electrically connected to the conductor 186 at the input of the amplifier 194 by a conductor 202 and resistance 204. The shaft 198 of the motor 192 is provided for operational purposes as indicated by the arrow 206.

The speed of the motor is thus controlled by the states of the electric contacts 176, 178, 180, 182 and 184. In the case of the Figure where the number of resistance which can be switched on and off is 5, there are 32 possible multiple values of $R_0$. The speed can then be varied according to discontinuous multiples of a value representing about 3% of the maximum speed of rotation of the motor.

It should be understood that the particular form of electric control circuit is not limited to that described above, particularly as regards the electronic variable speed control.

The apparatus according to the invention effects the switching of resistance which have values proportional to the successive terms of a geometric series of factor 2, the variation in the source of these resistances being used to vary the speed of the motor by suitable means.

The apparatus according to the invention is particularly provided for use in association with machines for working on glass and in particular machines for cutting plates of glass or grinding the edges of plates of glass.

It finds a particular application in the industrial manufacture of window panes for motor vehicles, in which ever increasing production rates are employed.

The apparatus according to the invention may be used for treating various types of car windows, being easily adapted for each type simply by providing it with the appropriate disc or band. Replacement of one disc or band by another can be carried out very quickly and does not require any special skill. Moreover, the disc or band can easily be copied in the case of loss or accidental destruction and can also easily be modified. The program of speeds can be visualized with this disc or band.

I claim:

1. Control apparatus for a machine for cutting a workpiece by means of a cutting tool in displacement against the workpiece, which control apparatus is operable to impose a program of speeds on this displacement, the said machine comprising a horizontal table to support the workpiece, a horizontal jig which defines a path for cutting, a freely displaceable carriage equipped with the cutting tool and a motor adapted to displace the carriage along the jig; the said apparatus comprising: a programming element having zones of varying transparency or reflectance; an emitter unit for emitting light beams to the programming element an an associated receptor unit for receiving the light beams which have been transmitted or reflected; means for turning the programming element so that one complete rotation of the programming element corresponds to one complete displacement of the carriage along the jig; an electric circuit connected to the receptor unit and to the motor for controlling the speed of rotation of the motor as a function of the intensity of the signal provided by the receptor unit so that the speed of displacement of the cutting tool varies during the movement along the path according to the program defined by the zones of the programming element.

2. Apparatus according to claim 1, wherein the programming element is a disc and the zones are sectors of concentric tracks.

3. Apparatus according to claim 2, wherein the disc is rotated about a fixed vertical shaft above the jig, the disc being rotated by the carriage by way of a horizontal rod one end of which is linked to the carriage while the other end is slidable in a sleeve which is integrally connected to the shaft of the disc.

4. Apparatus according to claim 3, wherein the emitter and receptor units are fixed.

5. Apparatus according to claim 1, wherein the programming element is a photographic negative.

6. Apparatus according to claim 2, wherein an emitter and associated receptor is provided for each track.

7. Apparatus according to claim 1, wherein the programming element has zones of low transparency or reflectance and zones of high transparency or reflectance, and the receptor unit comprises at least one photoelectric cell which responds to zones of low or high transparency or reflection, respectively, by two different levels of electric output potential.

8. Apparatus according to claim 7, wherein the electric circuit comprises at least one electric contact the open or closed state of which is controlled according to the two levels of output voltage to define two states of signal provided by each photoelectric cell.

9. Apparatus according to claim 8, wherein the electric circuit comprises: a plurality of contacts; a plurality of resistances having, respectively, consecutive values taken from a geometric progressing of factor 2, each of the said contacts being connected in parallel to one of the respective resistances; and means for supplying the said motor across the resistances and contacts which are in parallel.

10. Apparatus according to claim 9, wherein the motor is a continuous current motor supplied from a source of continuous current and the resistances and contacts in parallel are coupled between the supply and an electronic variable speed control electrically connected to the motor.

* * * * *